United States Patent
Satomi (10) Patent No.: US 11,194,530 B2
(45) Date of Patent: Dec. 7, 2021

(54) IMAGE FORMING APPARATUS THAT DISPLAYS STATUS OF JOB INSTRUCTED BY USER

(71) Applicant: KYOCERA Document Solutions Inc., Osaka (JP)

(72) Inventor: Seiki Satomi, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 16/908,628

(22) Filed: Jun. 22, 2020

(65) Prior Publication Data

US 2020/0409634 A1 Dec. 31, 2020

(30) Foreign Application Priority Data

Jun. 27, 2019 (JP) .............................. JP2019-120481

(51) Int. Cl.
*G06F 3/12* (2006.01)
*G06K 9/00* (2006.01)
*G06F 3/01* (2006.01)

(52) U.S. Cl.
CPC ............ *G06F 3/1238* (2013.01); *G06F 3/013* (2013.01); *G06F 3/1222* (2013.01); *G06F 3/1267* (2013.01); *G06K 9/00288* (2013.01)

(58) Field of Classification Search
CPC .............................. G06F 3/1238; G06F 3/1267
USPC ....................................................... 358/1.14
See application file for complete search history.

(56) References Cited

U.S. PATENT DOCUMENTS

| 2014/0146361 A1* | 5/2014 | Nakane .................. G06F 3/1285 |
| | | 358/1.15 |
| 2015/0049361 A1* | 2/2015 | Hirose ................... G06F 3/1267 |
| | | 358/1.15 |
| 2015/0062612 A1 | 3/2015 | Nishii |
| 2015/0264209 A1* | 9/2015 | Shiraishi .............. H04N 1/4433 |
| | | 358/1.15 |
| 2016/0100074 A1 | 4/2016 | Nishii |
| 2019/0230250 A1* | 7/2019 | Nobutani ............... H04N 1/442 |

FOREIGN PATENT DOCUMENTS

JP 2007-249466 A 9/2007
JP 2015-045916 A 3/2015

* cited by examiner

*Primary Examiner* — Thomas J Lett
(74) *Attorney, Agent, or Firm* — IP Business Solutions, LLC (57) ABSTRACT

An image forming apparatus includes a display, an imaging camera, a storage device, and a control device. The imaging camera captures an image of a user around the image forming apparatus. The storage device previously stores face images of users. When an instruction for executing a job is given by a user, the control device causes the image forming apparatus to execute the job instructed. When detecting a face image from the captured image captured by the imaging camera while causing the image forming apparatus to execute a job, the controller determines if the detected face image matches with any of the face images stored in the storage device, approves the face image determined to match, and causes the display to display a status of a waiting-for-execution job that is instructed by the user whom the approved face image indicates and different from the job under execution.

6 Claims, 5 Drawing Sheets

| PERSON'S ID | FACIAL CHARACTERISTICS (FACE INFORMATION) |
|---|---|
| AAA | EYE POSITION ea, NOSE POSITION na,······ |
| BBB | EYE POSITION eb, NOSE POSITION nb,······ |
| CCC | EYE POSITION ec, NOSE POSITION nc,······ |
| DDD | EYE POSITION ed, NOSE POSITION nd,······ |
| EEE | EYE POSITION ee, NOSE POSITION nee,······ |
| FFF | EYE POSITION ef, NOSE POSITION nf,······ |

IMAGE FORMING APPARATUS THAT DISPLAYS STATUS OF JOB INSTRUCTED BY USER

INCORPORATION BY REFERENCE

This application claims priority to Japanese Patent Application No. 2019-120481 filed on Jun. 27, 2019, the entire contents of which are incorporated by reference herein.

BACKGROUND

The present disclosure relates to an image forming apparatus that executes jobs respective instructed by a plurality of users, and particularly relates to a technique for displaying a status of a job.

Generally used image forming apparatuses approve users, permit, based on the approval, the users to log in to the image forming apparatuses, and execute copy jobs or print jobs instructed by the users.

In an image forming apparatus having a first technology, a camera device acquires characteristic data indicating characteristics of a user after the user is approved, and the camera device tracks the user based on the acquired characteristic data. When it is detected by this tracking that the user has left from the image forming apparatus, a login screen is displayed on an operation panel. When it is detected that the tracking is uninterrupted after the user has left and that the user has returned to a position where the user can operate the image forming apparatus, the screen operated last time is displayed. On the other hand, when it is detected that the tracking is interrupted after the user has left, logging out processing is executed. This reduces the time and effort for re-approval.

In an approval system having a second technology, from an image inputted by an imaging means, an approver who has been approved as a legitimate user and an operator of a device to be operated are specified, and whether the approver and the operator of the device to be operated are the same user or not is determined. When determining that the operator is not the same user with the approver, the operation is permitted to the operator, and a usage restriction stricter than in the case where the operator is the same user with the approver is imposed. As a result, even when the approver and the operator do not coincide, while security is being ensured, the operator can continue to use the device to be operated without obtaining permission for reuse.

SUMMARY

A technique improved over the above techniques is proposed as one aspect of the present disclosure.

An image forming apparatus according to one aspect of the present disclosure includes a display, an imaging camera, a storage device, and a control device. The imaging camera captures an image of a user around the image forming apparatus. The storage device previously stores face images of a plurality of users. The control device includes a processor and, through the processor executing a control program, acts as a controller. The controller is configured to cause, when an instruction for executing a job is given by a user, the image forming apparatus to execute the job instructed. When an instruction for executing a job is given by a user, the control device causes the image forming apparatus to execute the job instructed. When detecting a face image from the captured image captured by the imaging camera while causing the image forming apparatus to execute a job, the controller determines if the detected face image matches with any of the face images stored in the storage device, approves the face image determined to match, and causes the display to display a status of a waiting-for-execution job that is instructed by the user whom the approved face image indicates and different from the job under execution.

DETAILED DESCRIPTION

Hereinafter, a description will be given of an image forming apparatus according to an embodiment of the present disclosure, with reference to the drawings.

Figure 1:
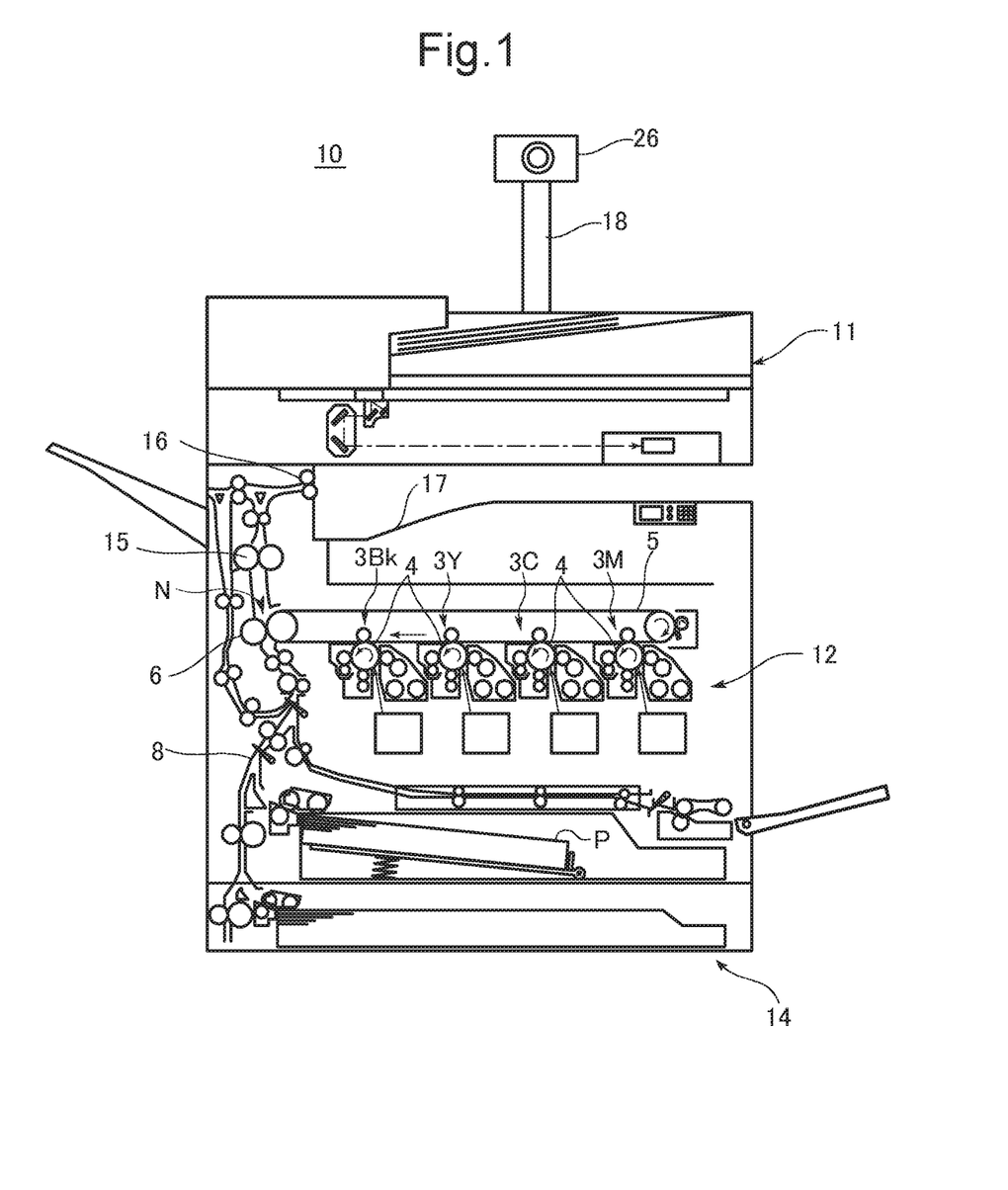
FIG. 1 is a sectional view showing an image forming apparatus according to one embodiment of the present disclosure.

FIG. 1 is a sectional view showing the image forming apparatus according to one embodiment of the present disclosure. As shown in FIG. 1, the image forming apparatus 10 of this embodiment is a multi-functional peripheral (MFP) equipped with multiple functions such as a copy function, a printer function, and a facsimile function. The image forming apparatus 10 includes an image reading device 11 and an image forming device 12.

The image reading device 11 includes an image pickup element that optically reads an image of an original document. Analog output of the image pickup element is converted into a digital signal, and image data representing the image of the original document is generated.

The image forming device 12 forms the image of the original document or an image received externally onto a recording sheet, and includes an image forming unit 3M for magenta, an image forming unit 3C for cyan, an image forming unit 3Y for yellow, and an image forming unit 3Bk for black. Each of the image forming units 3M, 3C, 3Y, and 3Bk uniformly charges a surface of a photosensitive drum 4 and exposes the surface of the photosensitive drum 4 to thereby form an electrostatic latent image on the surface of the photosensitive drum 4, then develops the electrostatic latent image formed on the surface of the photosensitive drum 4 into a toner image, and primarily transfers the toner image formed on the surface of the photosensitive drum 4 onto an intermediate transfer belt 5. Thereby, a color toner image is formed on the intermediate transfer belt 5. At a nip area N between the intermediate transfer belt 5 and a secondary transfer roller 6, the color toner image is secondary transferred onto a recording sheet P conveyed from a document feeder 14 through a conveyance path 8.

The recording sheet P is heated and pressurized by a fixing device 15, and the toner image on the recording sheet P is fixed by thermocompression bonding. The recording sheet P is outputted to an output tray 17 through an output roller 16.

Figure 2:
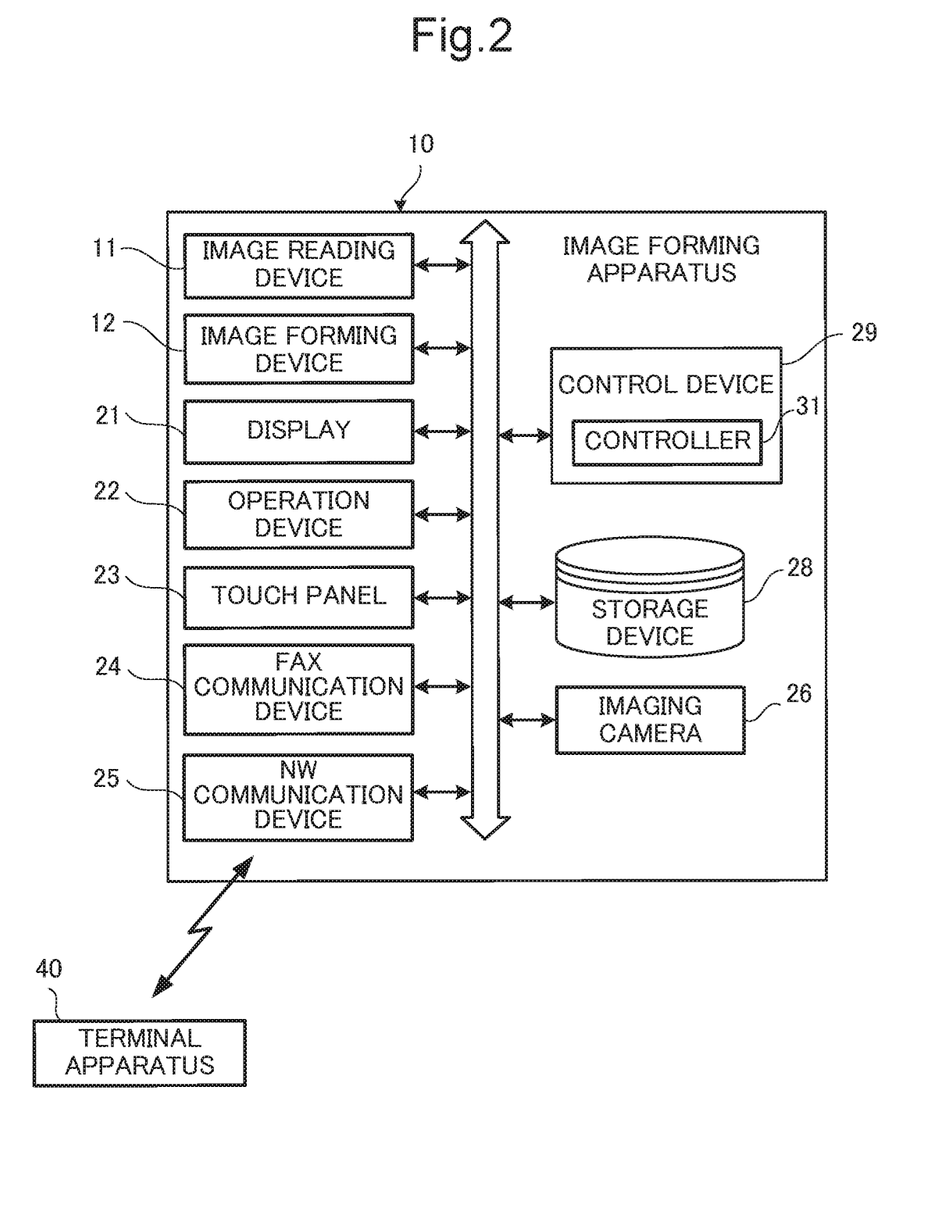
FIG. 2 is a block diagram showing a main internal configuration of the image forming apparatus.

FIG. 2 is a block diagram showing a main internal configuration of the image forming apparatus 10. As shown in FIG. 2, the image forming apparatus 10 includes the image reading device 11, the image forming device 12, a display 21, an operation device 22, a touch panel 23, a facsimile (FAX) communication device 24, a network (NW) communication device 25, the imaging camera 26, a storage device 28, and a control device 29. These components are configured to transmit and receive data or signal to and from each other via a bus.

The display 21 is a display device of, for example, a liquid crystal display (LCD) or an organic EL (organic light-emitting diode (OLED)) display. The operation device 22 includes physical keys such as a numeric keypad, an enter key, and a start key.

The touch panel 23 is disposed on a screen of the display device 21. The touch panel 23 is a touch panel of a so-called resistive film type or electrostatic capacity type and detects touch on the touch panel 23 by, for example, a finger of a user, together with a position of the aforementioned touch, and outputs a detection signal indicating the coordinates of the position of the touch to, for example, a controller 31 (to be described later) of the control device 29.

The NW communication device 25 is a communication interface including a communication module such as an un-illustrated LAN chip, is connected to a terminal apparatus 40 on a network, and transmits and receives an image and the like to and from the terminal apparatus 40.

The FAX communication device 24 transmits and receives an image to and from other image forming apparatus, a facsimile apparatus (not illustrated), and the like, via a network.

As shown in FIG. 1, the imaging camera 26 is fixed to the upper end of a pillar 18 projecting from the rear side of the main body of the image forming apparatus 10, and images the front of the image forming apparatus 10. The imaging camera 26 has capability of capturing wide viewing angle (for example, if the front of the imaging camera 26 is 0 degree, the range of 90 degrees on both right and left sides). Thus the imaging camera 26 captures not only a user standing in front of the image forming apparatus 10, but also captures another user standing around the image forming apparatus 10. Instead of the imaging camera 26 having wide viewing angle, a plurality of imaging cameras each having narrower viewing angle may be adopted; these imaging cameras may be arranged to orient in different directions so that different areas are captured by the respective imaging cameras and the total area of the imaging areas of the imaging cameras is the same as the area that can be captured by the aforesaid imaging camera having wide viewing angle.

the storage device 28 a large-capacity storage device such as a solid state drive (SSD) and a hard disk drive (HDD), and contains various application programs and various types of data.

The control device 29 is formed of a processor, a random access memory (RAM), a read only memory (ROM), and so on. The processor is, for example, a central processing unit (CPU), an application specific integrated circuit (ASIC), or a micro processing unit (MPU). The control device 29 acts as the controller 31 through the processor executing a control program stored in the ROM or the storage device 28.

The controller 31 collectively controls the image forming apparatus 10. The control device 29 is connected to the image reading device 11, the image forming device 12, the display 21, the operation device 22, the touch panel 23, the FAX communication device 24, the NW communication device 25, the imaging camera 26, and the storage device 28. The controller 31 controls operation of these components and transmits and receives a signal or data to and from the components.

The controller 31 serves a role as a processing unit that performs various kinds of processing required for image formation by the image forming apparatus 10. The controller 31 receives, in accordance with a detection signal outputted from the touch panel 23 or in accordance with operation performed on the physical keys provided on the operation device 22, an operation instruction entered by a user. Also, the controller 31 has a function of controlling display operation of the display device 21 and has a function of controlling communication operation of the FAX communication device 24 and the NW communication device 25. In addition, when an instruction for executing a job is given by a user, the controller 31 causes the image forming apparatus 10 to execute the job instructed.

Figure 3:
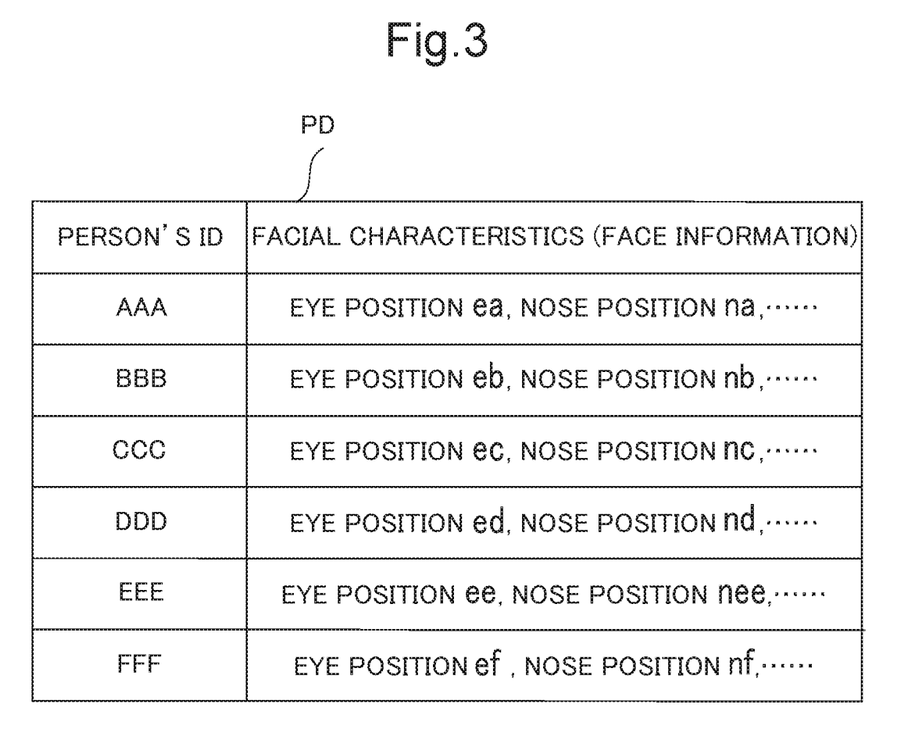
FIG. 3 is a diagram conceptually showing a user data table storing pieces of identification information of a plurality of users and facial characteristics (face information) of each of the users in association with each other.

The storage device 28 previously stores face images of a plurality of users. To be specific, the storage device 28 stores a user data table PD. As shown in FIG. 3, the user data table PD stores identification information ID of a plurality of users who are permitted to log in to the image forming apparatus 10 and facial characteristics (face information) of the users in association with each other. In the image forming apparatus 10 having the configuration described above, the imaging camera 26 is always capturing the periphery of the image forming apparatus 10 under the control of the controller 31. The controller 31 applies a known facial recognition processing on the captured images captured by the imaging camera 26 to detect a face image (or face images) included in the captured images. The controller 31 extracts the characteristics of the detected face image and collates the extracted characteristics of the face image with the facial characteristics (face information) of each of the users stored in the user data table PD. When the extracted characteristics of the face image match with the facial characteristics of any of the users stored in the user data table PD, approves the face image and permits the user whom the approved face image indicates to log in to the image forming apparatus 10.

For example, when the aforesaid user permitted to log in sets an original document onto the image reading device 11, operates the operation device 22 or the touch panel 23, selects a copy job, and instructs execution of the copy job, the controller 31 receives the instruction, causes the image reading device 11 to read an image of the original document, and causes the image forming device 12 to form the image of the original document on a recording sheet.

Also, for example, a user operates his or her terminal apparatus 40 (a PC, a mobile, and the like) to cause an image, an execution instruction of a print job, and the user's identification information ID to be transmitted from the terminal apparatus 40 to the image forming apparatus 10 via the network. In this case, in the image forming apparatus 10, when the image, the execution instruction of the print job, and the user's identification information ID are received by the NW communication device 25, the controller 31 determines whether the user's identification information ID matches with any of the identification information ID in the user data table PD. When the matching is determined, the controller 31 approves the identification information ID, permits the user who has the identification information ID to log in to the image forming apparatus 10, and on the basis of the received image or on the execution instruction of the print job, causes the image forming device 12 to form the image on the recording sheet.

Since the image forming apparatus 10 is shared by the plurality of users, there is a case where when a user gives an instruction to execute a job, the image forming apparatus 10 is under execution of another job and cannot immediately execute the job instructed. In such case, the controller 31 adds the job unable to immediately execute into the job queue JQ and makes the job to stand by. In this job queue JQ, for example, the job and the identification information ID of the user who instructed the job are associated with each other and are arranged in the order in which job execution instructions are received (during execution of jobs).

For example, while the image forming apparatus 10 is executing a job, when the user operates his or her terminal apparatus 40 to cause the image, the execution instruction of the print job, and the user's identification information ID to be transmitted from the terminal apparatus 40 to the image forming apparatus 10 via the network, in the image forming apparatus 10, the controller 31 receives the image, the execution instruction of the print job, and the user's identification information ID via the NW communication device 25. Since another job is already under execution, even in receiving the image, the execution instruction of the print job, and the user's identification information ID, the controller 31 does not execute this print job, but causes the storage device 28 to store the image, the execution instruction of the print job, and the user's identification information ID in association with each other and adds the print job and the user's identification information ID into the job queue JQ.

Every time the job being executed by the image forming apparatus 10 finishes, the controller 31 sequentially selects the earliest job in the waiting order in the job queue JQ and causes the image forming apparatus 10 to execute the job. In selecting the print job included in the job queue JQ, the controller 31 reads out the user's identification information ID associated with the print job in the job queue JQ and, on the basis of the image and the execution instruction of the print job stored in the storage device 28 along with this read out user's identification information ID, causes the image forming device 12 to form the image on the recording sheet.

On the other hand, while the image forming apparatus 10 is executing a job, when a user who has not instructed to execute the job under execution comes in front of the image forming apparatus 10 and the imaging camera 26 captures a face image of the user, the controller 31 detects the face image of the user included in the captured image captured by the imaging camera 26 and, when approving the detected face image, permits the user whom the approved face image indicates to log in to the image forming apparatus 10.

In such case, in the image forming apparatus 10, when the user sets the original document onto the image reading device 11 and operates the operation device 22 or the touch panel 23 to select the job to which the user gave the execution instruction and thus is in the queue, the controller 31 receives an interruption instruction for the job. Upon receiving the interruption instruction, the controller 31 temporarily interrupts another job and causes the image forming apparatus 10 to execute the job being the target for the interruption instruction. When this job is for example a copy job, the controller 31 causes the image reading device 11 to read the image of the original document and causes the image forming device 12 to form the image on the recording sheet. The controller 31 restarts the aforesaid another job when this copy job finishes.

Furthermore, when the image, the execution instruction of the print job, and the user's identification information ID transmitted from the user's terminal apparatus 40 via the network is received by the NW communication device 25 of the image forming apparatus 10, if the image forming apparatus 10 is executing another job, the controller 31 adds the user's print job into the job queue JQ.

Figure 4:
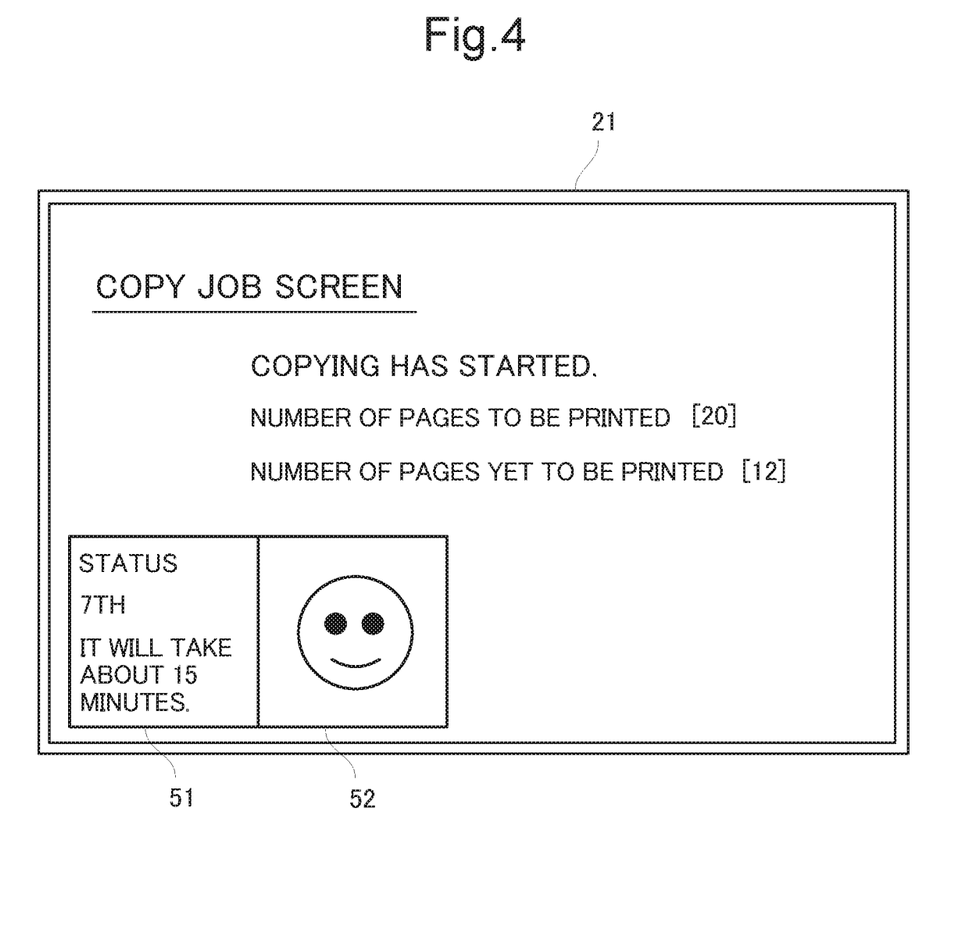
FIG. 4 is a diagram showing a state where status of a user's job and a face image of the user are displayed on a part of a screen showing a copy job under execution, the screen being displayed on a display.

It is assumed, at this time point, that after the aforesaid transmitting, the user comes in front of the image forming apparatus 10 and the imaging camera 26 captures the face image of the user. In this case, when the controller 31 approves the face image of the user, permits the user indicated by the approved face image to log in to the image forming apparatus 10. At this time point, based on the order, in the job queue JQ, of the identification information ID indicating the user, the controller 31 causes the display 21 to display, on the screen, a status of the print job associated with the identification information ID and the captured face image of the user. In this way, the user can immediately confirm the status of the job that he or she instructed. As shown in FIG. 4, the controller 31 causes the display 21 to display user's print job status 51, the face image of the user 52, and others on a portion of the display screen that shows information about the copy job being another job that is under execution at this point: for example, in the display screen, an area other than the area displaying the information about the copy job under the execution at this time point. The job status 51 includes the order (execution order) of the job in the job queue JQ and a time required to finish all jobs whose order is earlier than the job.

Next, processing procedures for allowing the plurality of users described above to share the image forming apparatus 10 will be summarized and explained with reference to a flowchart shown in FIG. 5.

First, the controller 31 determines whether the image forming apparatus 10 is executing a job (S101) and determines whether the job is set into the job queue JQ (S102). Upon determining that the image forming apparatus 10 is not executing the job ("NO" in S101) and the job is set into the job queue JQ ("YES" in S102), the controller 31 executes the job set into the job queue JQ (S103).

Upon determining that the image forming apparatus 10 is executing the job ("YES" in S101) or not executing the job ("NO" in S101) and the job is not set into the job queue JQ ("NO" in S102), the controller 31 does not execute step S103. The processing moves on to step S104.

Accordingly, by the processing S101 to S103, the controller 31 determines that the image forming apparatus 10 is in a state of: (a) job execution is continuing; (b) the job is not being executed and the job set into the job queue JQ is executable; or (c) the job is not being executed, and the waiting-for-execution job is not set into the job queue JQ.

Under this state, the controller 31 performs approval processing for the identification information ID or the face image (S104).

For example, the controller 31 detects a face image of a user (or face images of users) included in the captured images captured by the imaging camera 26, extracts characteristics of the detected face image, and when the extracted characteristics of the face image match with the facial characteristics of any of the users stored in the user data table PD, approves the extracted face image ("YES" in S104). The controller 31 permits the user (identification information ID) indicated by the approved face image to log in to the image forming apparatus 10 (S105).

Alternatively, when the image, the execution instruction of the print job, and the user's identification information ID are transmitted from the user's terminal apparatus 40 via the network and received by the NW communication device 25 of the image forming apparatus 10, the controller 31 determines if the user's identification information ID matches with any identification information ID in the user data table PD. When the match is determined, the controller 31 approves the identification information ID ("YES" in S104), and permits the user who has the identification information ID to log in to the image forming apparatus 10 (S105).

Here, even for the user who has permitted to log in by the approval of the identification information ID, when the captured images include the face image of that user and the face image is approved, in S104, the controller 31 redundantly gives the login permission by the approval of the face image.

When not approving the face image or the identification information ID of the user ("NO" in S104), the controller 31 returns to the processing that starts from S101 without giving the above login permission.

As described thus far, when the user comes in front of the image forming apparatus 10 and is captured by the imaging camera 26, and the face image of the user is approved, or when the image, the execution instruction of the print job, and the user's identification information ID, which were transmitted from the user's terminal apparatus 40, are received by the NW communication device 25 of the image forming apparatus 10 and the user's identification information ID is approved, the login permission is given to the user. At this time point, when the controller 31 performs the approval processing on each of a plurality of pieces of identification information ID or face images (S104) and approves the login for each of the users (S105), the controller 31 gives redundantly the login permission to each of the users.

When the controller 31 approves the face image or the identification information ID of the user ("YES" in S104) and permits the user to log in to the image forming apparatus 10 (S105), the controller 31 determines whether a job execution is being instructed by the user (S106).

For example, the controller 31 determines that the job execution is being instructed by the user ("YES"106) in either of the following cases: (1) receiving the job execution instruction inputted by the user through operating the operation device 22 or the touch panel 23; or (2) the image, the execution instruction of the print job, and the user's identification information ID are being received by the NW communication device 25 of the image forming apparatus 10 from the user's terminal apparatus 40 via the network. The controller 31 in this case determines whether another job different from the job, which is instructed to be executed in step S106, is under execution by the image forming apparatus 10 (S107).

When the controller 31 determines that the image forming apparatus 10 is not under execution of another job ("NO" in S107), the controller 31 causes the image forming apparatus 10 to execute the user's job instructed in step S106 (S108). For example, when the user operates the operation device 22 or the touch panel 23 and the execution of the copy job is being instructed in step S106, the controller 31 causes the image forming apparatus 10 to execute the copy job, causes the image reading device 11 to read the image of the original document, and causes the image forming device 12 to form the image on the recording sheet. Also, when the image, the execution instruction of the print job, and the user's identification information ID are being received by the NW communication device 25 of the image forming apparatus 10 from the user's terminal apparatus 40 in step S106, the controller 31 causes the image forming apparatus 10 to execute the print job and causes the image forming device 12 to form the image on the recording sheet. After this, the controller 31 returns to the processing starting from S106.

When the controller 31 determines that the image forming apparatus 10 is under execution of another job ("YES" in S107), the controller 31 associates the job, which is instructed to be executed in step S106, and the identification information ID of the user who has instructed the execution, and adds the job into the job queue JQ (S109). Following the instruction from the user, the controller 31 then executes interruption processing for the job (S110, S111).

For example, upon receiving input of the interruption instruction for the job ("YES" in S110) through operation of the operation device 22 or the touch panel 23 performed by the user, the controller 31 executes the interruption processing for the job (S111). The interruption processing is a processing including suspending another job under the execution, executing the user's job instructed in step S106, and after the instructed user's job is finished, restarting the suspended another job. After executing the interruption processing, the controller 31 deletes from the job queue JQ the job made to be executed as the interrupt target and the identification information ID of the user who has instructed the execution (this applies to all the interruption processing to be described below). After step S111, the processing returns to S106.

Furthermore, when not receiving the input of the interruption instruction for the job from the user in step S110 ("NO" in S110), the controller 31 skips the processing in S111 and does not execute the interruption processing for the job. The processing returns to S106 thereafter.

On the other hand, when determining that the job execution is not instructed by the user who is given the login permission ("NO" S106), the controller 31 determines whether there is a user who is permitted to log in in step S104 by the approval of the face image (S112).

When determining that there is a user whose approval in step S104 has been done based on the face image ("YES" in S112), the controller 31 searches the job associated with the identification information ID this user from the job queue JQ and, as an example shown in FIG. 4, causes the display 21 to display, on the screen, the status of the job extracted by this searching, with the face image used in the approval processing in step S104 (S113). The controller 31, at this point, causes the display 21 to display the status of the job set into the job queue JQ. Therefore, the job having already been executed at the time point of executing step S113 is not subject to the processing in step S113. As the example shown in FIG. 4, the controller 31 causes the display 21 to display, on the display screen, the information on the job having already been executed at the time point of executing step S113 separately from the status of the job set into the job queue JQ.

As described above, since the plurality of users can log in redundantly to the image forming apparatus 10, there may be a user who has logged in but does not instruct job execution. Therefore, if the job associated with the identification information ID read out as above is not in the job queue JQ, as the status, the controller 31 causes the display 21 to display, on the screen, information indicating that the job of the user indicated by the identification information ID is not set in the job queue JQ, and the face image of the user.

If the identification information ID read out as above is more than one, the controller 31 causes the display 21 to display, on the screen, statuses for all the users that the plurality of pieces of the identification information ID indicate, and the face images of the users.

For example, when the image, the execution instruction of the print job, and the user's identification information ID are transmitted from the user's terminal apparatus 40 via the network and received by the NW communication device 25 of the image forming apparatus 10, if another job is under the execution, the controller 31 does not cause the image forming apparatus 10 to execute the print job, but associates the print job with the identification information ID to add and set into the job queue JQ. It will be assumed that after this the user comes up to the image forming apparatus 10 to gather the recording sheet to be printed by the print job. At that time, the user is imaged by the imaging camera 26. When the controller 31 has approved the face image ("YES" in S104) and permitted the user indicated by the face image to log in (S105), but does not receive the execution instruction for the job ("NO" in S106) and determines that there is the user whose approval in step S104 has been done based on the face image ("YES" in S112), the controller 31 searches, from the job queue JQ, jobs associated with pieces of identification information ID of each of the users whose approval in step S104 has been done based on the face image, and causes the display 21 to display, on the screen, the statuses of these jobs together with the face images of the users (S113). Therefore, the display 21 displays also the status of the print job of the user who, after the execution instruction of the print job has been given, comes up to the image forming apparatus 10 to gather the recording sheet that is to be printed by the print job.

When the controller 31 receives the interruption instruction for the job displayed on the screen of the display 21 ("YES" in S114), the controller 31 executes the interruption processing for the job (S115), the interruption instruction being inputted through the operation on the operation device 22 or the touch panel 23 by the user.

When the controller 31 determines that there is no user whose approval in step S104 has been done based on the face image ("NO" in S112), the processing returns to step S101 without performing steps S113 to S115.

As described above, in the present embodiment, a user can immediately confirm the status of the job that he or she has gave the execution instruction, without performing any special operation. Furthermore, the user is allowed to interrupt another job so that his or her job can be executed.

In the generally used image forming apparatus described in the above BACKGROUND, a user is permitted to log in to the image forming apparatus based on the an approval, and the job instructed by the user is instructed. In a case where such the image forming apparatus is shared by the plurality of users, a job instructed by a user is not always executed immediately because a job queue or a job interruption may occur. Also, in a multi-functional peripheral equipped with functions such as a copy function, a printer function, and a facsimile function, there may be a case where jobs are executed respectively by several functions at the same time, so that the job instructed by the user may not be executed immediately.

When the job instructed by the user is not executed immediately as described above, the user can operate an operation part of the image forming apparatus to causes a display screen to display the status of the job that he or she has instructed to confirm the status. There is a case, however, such operation is complicated, or the operation part is occupied by another user and the status of the job cannot be seen.

It is desirable for allowing the user to immediately confirm, without any special operation, the status of the job that he or she instructed.

It is considered possible to automate the approval of a user or an operator imaged by a camera device or an imaging means by applying the first and second technologies described in the above BACKGROUND. However, even by such the technology, the user still cannot immediately confirm the status of the job that he or she has instructed.

The present embodiment in contrast can provide the technology capable of using the approval of the user's face and allowing the user to immediately confirm the status of the job he or she has instructed.

Figure 5:
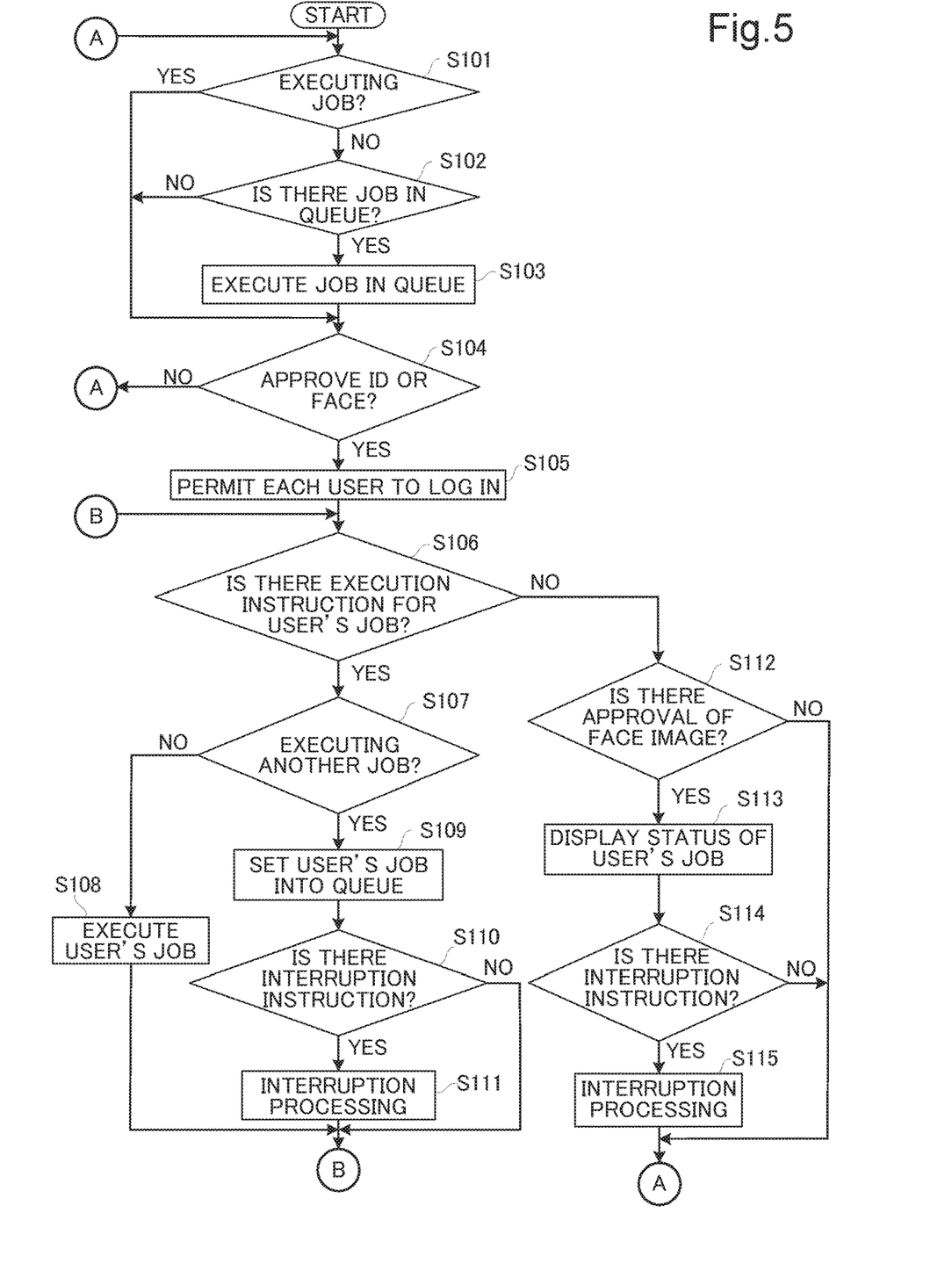
FIG. 5 is a flowchart showing processing procedures for sharing the image forming apparatus by the plurality of users.

In the above embodiment, copy jobs and print jobs are illustrated, but the processing shown in FIG. 5 can be applied to other types of jobs.

In the above embodiment, the controller 31 detects and approves a face image of a user (or face images of users) included in the captured images captured by the imaging camera 26. The controller 31 may be configured to approve the face image with further added condition of determining if the size of the face image is a predetermined certain size or more. In that case, the controller 31 detects the size of the face image of one user (or the size of each of the face images of the plurality of users) in the captured images, determines whether the size of the face image is the predetermined certain size or more. Upon determining that the size of the face image is the predetermined certain size or more, the controller 31 extracts the characteristics of the detected face image, and when determining that the extracted characteristics of the face image match with the facial characteristics of any of the users stored in the user data table PD, approves the extracted face image.

Alternatively, the controller 31 may be configured to approve the face image with further added condition of determining whether a gaze of an eye that the face image detected from the captured images shows is directing to the image forming apparatus 10. In that case, using a known method, the controller 31 detects the direction of the gaze of the face image of one user (or the gaze of each of the face images of the plurality of users) in the captured images. Only for the face image determined as including the gaze directed to the image forming apparatus 10, the controller 31 performs the determination on whether the characteristics of the face image match with the facial characteristics of any of the users stored in the user data table PD, and approves the face image having the characteristics that match.

The configurations and processing of the foregoing embodiment detailed above with reference to FIG. 1 to FIG. 5 are merely exemplary, and not intended to limit the present disclosure to the configurations and processing.

While the present disclosure has been described in detail with reference to the embodiments thereof, it would be apparent to those skilled in the art the various changes and modifications may be made therein within the scope defined by the appended claims.

What is claimed is:

1. An image forming apparatus comprising:
   a display,
   an imaging camera that captures an image of a user around the image forming apparatus;
   a storage device that previously stores face images of a plurality of users; and
   a control device that includes a processor and, through the processor executing a control program, acts as a controller configured to cause, when an instruction for executing a first job is given by a first user, the image forming apparatus to execute the first job, wherein when detecting a face image from the captured image captured by the imaging camera while causing the image forming apparatus to execute the first job, the controller determines if the detected face image matches with any of the face images stored in the storage device, approves the face image determined to match, cause the display to display information on the first job under execution in a first area, and causes the display to display, in a second area other than the first area, a status of a second job that is waiting-for-execution job instructed by a second user whom the approved face image indicates and different from the first job, wherein, when the controller has not received the instruction for executing the second job, the controller causes the display to display, in the second area, information indicating that the instruction for executing the second job has not been received.

2. The image forming apparatus according to claim 1, wherein the controller causes the display to display: the status of the second job; and the face image of the second user captured by the imaging camera.

3. The image forming apparatus according to claim 1, wherein when determining that a plurality of face images respectively match with any of the face images stored in the storage device while causing the image forming apparatus to execute the first job, the controller approves each of the face images and causes the display to display statuses of the second jobs that are instructed respectively by the second users whom each of the approved face images indicates and different from the first job under execution.

4. The image forming apparatus according to claim 1, wherein the controller determines whether a size of the face image determined to match is a pre-determined certain size or more and, only when determining that the size of the face image determined to match is the certain size or more, approves the face image.

5. The image forming apparatus according to claim 1, wherein the controller determines whether a gaze of an eye that the face image shows is directing to the image forming apparatus and, when determining that the gaze is directing to the image forming apparatus, approves the face image.

6. The image forming apparatus according to claim 1, wherein as the status of the second job, the controller causes the display to display an execution order of the second job in a job queue and a time required to finish all jobs whose execution orders are earlier than the second job.

* * * * *